(12) United States Patent
Yang

(10) Patent No.: US 10,222,642 B2
(45) Date of Patent: Mar. 5, 2019

(54) DISPLAY DEVICE AND DRIVING METHOD AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 13 days.

(21) Appl. No.: 14/762,667

(22) PCT Filed: Oct. 31, 2014

(86) PCT No.: PCT/CN2014/090041
§ 371 (c)(1),
(2) Date: Jul. 22, 2015

(87) PCT Pub. No.: WO2016/000370
PCT Pub. Date: Jan. 7, 2016

(65) Prior Publication Data
US 2016/0246094 A1    Aug. 25, 2016

(30) Foreign Application Priority Data

Jun. 30, 2014 (CN) .......................... 2014 1 0307127

(51) Int. Cl.
*G06F 3/041* (2006.01)
*G09G 3/36* (2006.01)
(Continued)

(52) U.S. Cl.
CPC ..... *G02F 1/13338* (2013.01); *G02B 27/2214* (2013.01); *G02F 1/1347* (2013.01);
(Continued)

(58) Field of Classification Search
CPC ......... G06F 3/041; G06F 3/0412; G09G 3/36; G02F 1/13338; G02F 1/134309; H04N 13/00
(Continued)

(56) References Cited

U.S. PATENT DOCUMENTS 9,857,616 B2 * 1/2018 Kim .................... G02F 1/13338
2009/0243817 A1 * 10/2009 Son ...................... G06F 3/0418
340/407.2
(Continued)

FOREIGN PATENT DOCUMENTS

CN     102707471 A    10/2012
CN     102707514 A    10/2012
(Continued)

OTHER PUBLICATIONS

International Search Report corresponding to PCT/CN2014/090041; English Translation of Written Opinion of Form PCT/ISA/237.

*Primary Examiner* — Benyam Ketema
(74) *Attorney, Agent, or Firm* — Nath, Goldberg & Meyer; Joshua B. Goldberg

(57) ABSTRACT

The present invention discloses a display device and a driving method and manufacturing method thereof. The display device comprises: a display module and a liquid crystal cell which are arranged opposite to each other. The display module comprises first electrodes, and the liquid crystal cell comprises second electrodes and a third electrode arranged opposite to the second electrodes. The first electrodes and the second electrodes extend in different
(Continued)

directions. During stereoscopic display, a coupling electric field is formed between the first electrodes and the second electrodes within a touch period, and a grating electric field is formed between the second electrodes and the third electrode within a stereoscopic display period. The coupling electric field is used for generating a touch signal when a touch occurs, and the grating electric field allows the display module to form a display picture for stereoscopic display.

13 Claims, 3 Drawing Sheets

(51) Int. Cl.
- H04N 13/302 (2018.01)
- G02B 27/22 (2018.01)
- G02F 1/1333 (2006.01)
- G02F 1/1343 (2006.01)
- G02F 1/1347 (2006.01)
- H04N 13/31 (2018.01)
- G09G 3/00 (2006.01)

(52) U.S. Cl.
CPC ...... *G02F 1/134309* (2013.01); *G06F 3/0412* (2013.01); *G09G 3/36* (2013.01); *H04N 13/31* (2018.05); *G02F 2001/134372* (2013.01); *G06F 2203/04103* (2013.01); *G09G 3/003* (2013.01); *G09G 3/3655* (2013.01)

(58) Field of Classification Search
USPC .......................................................... 345/173
See application file for complete search history.

(56) References Cited

U.S. PATENT DOCUMENTS

| | | | | |
|---|---|---|---|---|
| 2009/0256818 A1* | 10/2009 | Noguchi | ............. | G02F 1/13338 345/174 |
| 2011/0096251 A1* | 4/2011 | Son | ..................... | G02F 1/13338 349/15 |
| 2011/0109622 A1* | 5/2011 | Son | ..................... | G02F 1/13338 345/419 |
| 2011/0267293 A1* | 11/2011 | Noguchi | ............... | G06F 3/0416 345/173 |
| 2012/0044178 A1* | 2/2012 | Song | ................. | G02F 1/136204 345/173 |
| 2012/0218482 A1* | 8/2012 | Hwang | ................... | G06F 3/044 349/12 |
| 2012/0242615 A1* | 9/2012 | Teraguchi | ............ | G06F 3/0412 345/174 |
| 2012/0327349 A1* | 12/2012 | Wang | ..................... | G02B 27/26 349/139 |
| 2013/0155059 A1* | 6/2013 | Wang | ..................... | G06F 3/041 345/419 |
| 2013/0162918 A1* | 6/2013 | Mayumi | ............. | G02F 1/13338 349/12 |
| 2013/0215076 A1* | 8/2013 | Lee | ......... | G09G 3/003 345/174 |
| 2013/0335463 A1* | 12/2013 | Chiang | ................. | G09G 3/003 345/697 |
| 2014/0009433 A1* | 1/2014 | Chen | ...................... | G06F 3/044 345/174 |
| 2014/0111470 A1* | 4/2014 | Wu | ................... | G02F 1/134309 345/174 |
| 2014/0118644 A1* | 5/2014 | Liu | ..................... | H04N 13/0497 349/15 |
| 2014/0125626 A1* | 5/2014 | Yang | ................. | G02F 1/134336 345/174 |
| 2014/0139459 A1* | 5/2014 | Wu | ........................ | G06F 3/0416 345/173 |
| 2014/0184943 A1* | 7/2014 | Yang | ................... | G02F 1/13338 349/12 |
| 2014/0211104 A1* | 7/2014 | Yang | ........................ | G06F 3/041 349/12 |
| 2014/0253490 A1* | 9/2014 | Sumi | ..................... | G09G 3/003 345/174 |
| 2015/0036062 A1* | 2/2015 | Chien | ................... | G06F 3/0421 349/12 |
| 2015/0130751 A1* | 5/2015 | Teraguchi | ........... | G02F 1/13338 345/174 |
| 2015/0160495 A1* | 6/2015 | Yang | ................. | G02B 27/2264 349/12 |
| 2015/0168761 A1* | 6/2015 | Chang | ................ | G02F 1/13338 349/12 |

FOREIGN PATENT DOCUMENTS

| | | |
|---|---|---|
| CN | 103091909 A | 5/2013 |
| CN | 103116233 A | 5/2013 |
| CN | 103293726 A | 9/2013 |
| CN | 104102054 A | 10/2014 |
| JP | 4457323 B2 | 4/2010 |

* cited by examiner

DISPLAY DEVICE AND DRIVING METHOD AND MANUFACTURING METHOD THEREOF

FIELD OF THE INVENTION

The present invention relates to the field of display technology, in particular relates to a display device and a driving method and manufacturing method thereof.

BACKGROUND OF THE INVENTION

In recent years, with the development of display technology, stereoscopic display technologies have become increasingly popular, and large manufacturers have invested heavily in the stereoscopic display field and intensely competed with each other. Three-dimensional stereoscopic graph (3D for short) display technology is an important technology among the stereoscopic display technologies. The principle of the 3D display technology is that left and right eyes simultaneously receive images from different angles such that 3D effects of real eyes are simulated.

At present, 3D display devices have a single display function, and a majority of them have no touch function. The real experience brought to consumers by the 3D display technology and the touch technology makes the popularity of them higher and higher. Driven by such a large market demand, products combining the 3D display technology and the touch technology have drawn attention from and been actively developed by numerous display product manufacturers.

In the prior art, a display device formed by combining the 3D display technology and the touch technology generally includes a 3D display module and an Add On Touch module. The 3D display module and the Add On Touch module are combined to form a display device with the 3D display technology and the touch technology. However, the above-mentioned display device is relatively thick, causing the transmittance and display effect to be degraded; and such display device is complicated in manufacturing process and high in manufacturing cost.

SUMMARY OF THE INVENTION

The present invention provides a display device and a driving method and manufacturing method thereof, for improving the transmittance and display effect of the display device and realizing simple manufacturing process and low manufacturing cost of the display device.

To achieve the above object, the present invention provides a display device, including a display module and a liquid crystal cell which are arranged opposite to each other, wherein the display module includes first electrodes, and the liquid crystal cell includes second electrodes and a third electrode arranged opposite to the second electrodes, with the first electrodes and the second electrodes extending in different directions; and during stereoscopic display, a coupling electric field is formed between the first electrodes and the second electrodes within a touch period, and a grating electric field is formed between the second electrodes and the third electrode within a stereoscopic display period; and the coupling electric field is used for generating a touch signal when a touch occurs, and the grating electric field allows the display module to form a display picture for stereoscopic display.

Optionally, the display module further includes a fourth electrode; and during flat panel display, a coupling electric field is formed between the first electrodes and the second electrodes within a touch period, a flat display electric field is formed between the fourth electrode and the first electrodes within a flat display period, and the flat display electric field allows the display module to form a display picture for flat panel display.

Optionally, the first electrodes are of a strip structure, the second electrodes are of a strip structure, and the third electrode is of a planar structure.

Optionally, the liquid crystal cell includes an upper substrate and a lower substrate which are arranged opposite to each other, with liquid crystals being filled there between, the second electrodes is disposed on the lower substrate, and the third electrode is disposed on the upper substrate.

Optionally, the display module includes a first substrate and a second substrate which are arranged opposite to each other, with liquid crystals being filled there between, the lower substrate is located on the first substrate, and the first substrate comprises the first electrodes.

Optionally, during stereoscopic display, a voltage signal applied on the third electrode is the same as a voltage signal applied on the second electrodes.

Optionally, during flat panel display, a voltage signal applied on the third electrode is different from a voltage signal applied on the second electrodes.

To achieve the above object, the present invention provides a driving method for driving a display device; the display device includes a display module and a liquid crystal cell which are arranged opposite to each other, the display module including first electrodes, the liquid crystal cell including second electrodes and a third electrode arranged opposite to the second electrodes, and the first electrodes and the second electrodes extending in different directions;

the driving method includes:

during stereoscopic display, forming a coupling electric field between the first electrodes and the second electrodes within a touch period, the coupling electric field being used for generating a touch signal when a touch occurs; and forming a grating electric field between the second electrodes and the third electrode within a stereoscopic display period, the grating electric field allowing the display module to form a display picture for stereoscopic display.

Optionally, the display module further includes a fourth electrode.

The driving method further includes:

during flat panel display, forming a coupling electric field between the first electrodes and the second electrodes within a touch period; and forming a flat panel display electric field between the fourth electrode and the first electrodes within a flat panel display period, the flat panel display electric field allowing the display module to form a display picture for flat panel display.

To achieve the above object, the present invention provides a manufacturing method of a display device, including:

preparing a display module, the display module including first electrodes;

preparing a liquid crystal cell, the liquid crystal cell including second electrodes and a third electrode arranged opposite to the second electrodes, the first electrodes and the second electrodes extending in different directions; during stereoscopic display, a coupling electric field being formed between the first electrodes and the second electrodes within a touch period, and a grating electric field being formed between the second electrodes and the third electrode within a stereoscopic display period, the coupling electric field being used for generating a touch signal when a touch occurs, and the grating electric field allowing the display module to form a display picture for stereoscopic display; and arranging the display module and the liquid crystal cell opposite to each other.

The present invention has the following beneficial effects:

In the technical solutions of the display device and the driving method and manufacturing method thereof provided by the present invention, the display device includes a display module and a liquid crystal cell; the display module includes first electrodes, and the liquid crystal cell includes second electrodes and a third electrode arranged opposite to the second electrodes; a coupling electric field is formed between the first electrodes and the second electrodes within a touch period, and a grating electric field is formed between the second electrodes and the third electrode within a stereoscopic display period; the grating electric field allows the display module to form a display picture for stereoscopic display; in the display device provided by the present invention, the combination of a touch technology and a stereoscopic display technology is realized by the display module and the liquid crystal cell, thus the thickness of the display device is reduced, meanwhile the transmittance and display effect of the display device are improved, and moreover the display module and the liquid crystal cell are simple in manufacturing process and low in manufacturing cost.

DETAILED DESCRIPTION OF THE EMBODIMENTS

To make those skilled in the art better understand the technical solutions of the present invention, the display device and the driving method and manufacturing method thereof provided by the present invention will be described below in details with reference to the accompanying drawings.

Figure 1:
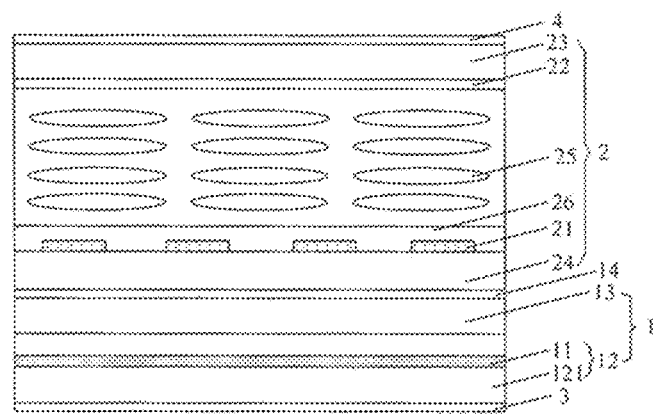
FIG. 1 is a structure diagram of a display device provided by embodiment 1 of the present invention.

FIG. 1 is a structure diagram of a display device provided by embodiment 1 of the present invention. As shown in FIG. 1, the display device includes a display module 1 and a liquid crystal cell 2 which are arranged opposite to each other. The display module 1 includes first electrodes 11, and the liquid crystal cell 2 includes second electrodes 21 and a third electrode 22 arranged opposite to the second electrodes 21. The first electrodes 11 and the second electrodes 21 extend in different directions. Preferably, the extension direction of the first electrodes 11 and the extension direction of the second electrodes 21 are orthogonal to each other. During stereoscopic display, a coupling electric field is formed between the first electrodes 11 and the second electrode 21 within a touch period, and a grating electric field is formed between the second electrodes 21 and the third electrode 22 within a stereoscopic display period. The coupling electric field is used for generating a touch signal when a touch occurs, and the grating electric field is used for enabling the display module 1 to form stereoscopic picture and thus form a display picture for stereoscopic display.

Optionally, the display module 1 further includes a fourth electrode (not shown in the figure). During flat panel display, a coupling electric field is formed between the first electrodes 11 and the second electrodes 21 within a touch period, and a flat panel display electric field is formed between the fourth electrode and the first electrodes 11 within a flat panel display period. The flat panel display electric field allows the display module 1 to display a flat panel picture.

Figure 2:
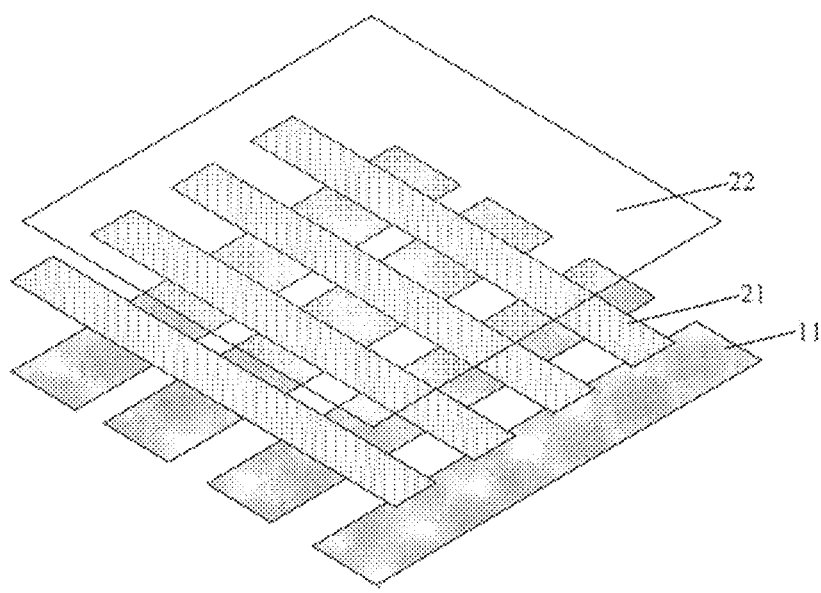
FIG. 2 is a perspective diagram of first electrodes, second electrodes and a third electrode in FIG. 1.

FIG. 2 is a perspective diagram of the first electrodes, the second electrodes and the third electrode in FIG. 1. As shown in FIG. 2, in this embodiment, there are pluralities of first electrodes 11 that are arranged in parallel; and there are pluralities of second electrodes 21 that are arranged in parallel. Preferably, the first electrodes 11 are of a strip structure, and the second electrodes 21 are of a strip structure. The extension direction of the first electrodes 11 is vertical to that of the second electrodes 21. Preferably, the third electrode 22 is of a planar structure, and may be made from high resistance material. Optionally, the first electrodes 11 may include a plurality of electrically connected first sub-electrodes, and some of the pluralities of first sub-electrodes are dummy sub-electrodes. The pluralities of first sub-electrodes form the first electrodes 11 in a bundled wiring manner, so that the touch effect is improved.

In this embodiment, the liquid crystal cell 2 includes an upper substrate 23 and a lower substrate 24 which are arranged opposite to each other. Liquid crystals 25 are filled between the upper substrate 23 and the lower substrate 24. The second electrodes 21 are disposed on the lower substrate 24, and the third electrode 22 is disposed on the upper substrate 23. Optionally, a protective layer 26 is further formed above the second electrodes 21. In this embodiment, the liquid crystal cell 2 is a 3D grating. Specifically, the 3D grating is a glasses-free 3D grating.

Figure 3:
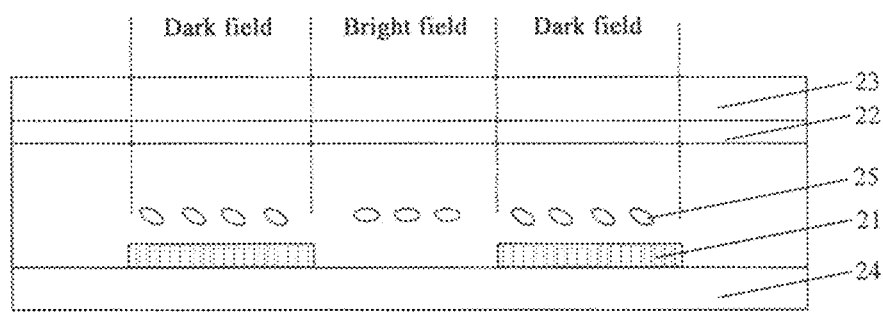
FIG. 3 is a working principle diagram of a liquid crystal cell in FIG. 2.

FIG. 3 is a working principle diagram of the liquid crystal cell in FIG. 2. As shown in FIG. 3, the display mode of the liquid crystal cell 2 is a TN mode, and the TN mode is a long white mode. When the grating electric field is formed between the second electrodes 21 and the third electrode 22, the grating electric field may allow the liquid crystals 25 located within an electric field region above the second electrodes 21 to be deflected, so that the electric field region becomes a dark field region. However, within a non-electric field region adjacent to the electric field region, as no grating electric field is formed, the liquid crystals 25 therein are not deflected, so that the non-electric field region becomes a bright field region. As the TN mode is a long white mode, the grating electric field is a vertical electric field. The bright field region and the dark field region are arranged alternately to produce a white and black alternating barrier effect, so that the display module 1 forms a display picture for stereoscopic display.

During flat panel display, the non-electric field region and the electric field region are both required to be bright field regions. In this case, the voltage signal applied on the second electrodes 21 is the same as the voltage signal applied on the third electrode 22 and no voltage difference is formed between the second electrodes 21 and the third electrode 22, thus no grating electric field can be formed between the second electrodes 21 and the third electrode 22, so that both the non-electric field region and the electric field region become bright field regions. Preferably, both the voltage signal applied on the second electrodes 21 and the voltage applied on the third electrode 22 are 0V.

Figure 4:
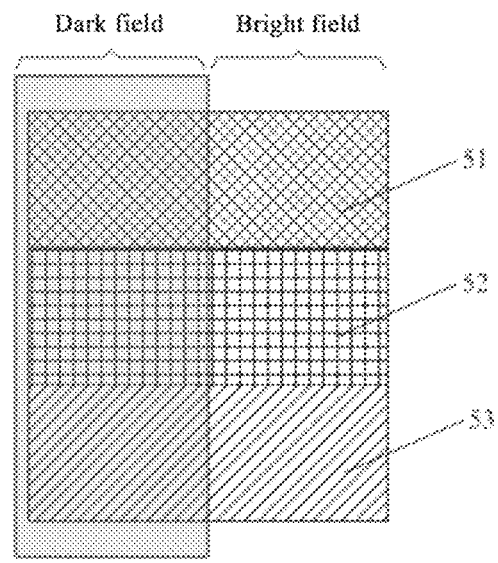
FIG. 4 is a correspondence diagram of the second electrodes and a color matrix graph in a second substrate.

In this embodiment, the display module 1 includes a first substrate 12 and a second substrate 13 which are arranged opposite to each other. Liquid crystals (not shown in the figure) are filled between the first substrate 12 and the second substrate 13. The lower substrate 24 is located on the second substrate 13, and the first substrate 12 includes the first electrodes 11. Preferably, the display module 1 is an Advanced Super Dimension Switch (ADS for short) display module. The first substrate 12 may be an array substrate, and the second substrate 13 may be a color film substrate. Specifically, the first substrate 12 may include a first base substrate 121, a thin film transistor formed on the first base substrate 121, a fourth electrode and the first electrodes 11. The thin film transistor is electrically connected to the fourth electrode and may be located above or under the fourth electrode, and the first electrodes 11 are located above the fourth electrode. Preferably, the fourth electrode is of a planar structure. In the display module 1 shown in FIG. 1, the first electrodes 11 may be common electrodes, and the fourth electrode may be a pixel electrode. It is to be noted that the thin film transistor and the fourth electrode are not specifically shown in FIG. 1. FIG. 4 is a correspondence diagram of the second electrodes and a color matrix graph in the second substrate. As shown in FIG. 4, the second substrate 13 is a color film substrate and includes orderly arranged color matrix graphs. The color matrix graphs may include a red matrix graph 51, a green matrix graph 52 or a blue matrix graph 53. The width of each of the second electrodes 21 may be a half of the width of the color matrix graphs, so each of the second electrodes 21 may cover a half of the color matrix graphs.

As shown in FIG. 1, a first polarizer 3 is further provided on a light incoming side of the first base substrate 121, a second polarizer 4 is further provided on a light outgoing side of the upper substrate 23, and a third polarizer 14 is further provided on a light outgoing side of the second substrate 13.

The operation process of the display device in this embodiment will be described as below in detail with reference to FIGS. 5 and 6.

Figure 5:
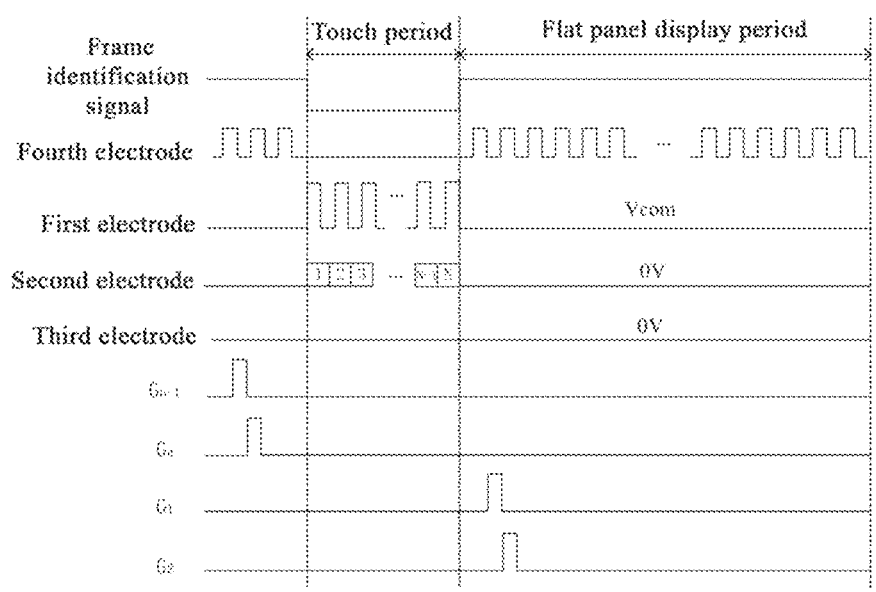
FIG. 5 is a timing diagram of a control signal when the display device performs flat panel display.

FIG. 5 is a timing diagram of a control signal when the display device performs flat panel display. As shown in FIG. 5, in order to reduce the mutual interference between the touch and the flat panel display, the display device may be driven in a time division driving manner, wherein a touch period may be 4 ms, and a flat panel display period may be 12.67 ms. The touch period and the flat panel display period are distinguished by a frame identification signal (Vsync). Specifically, as shown in FIG. 5, when the frame identification signal is a low level signal, the display device is in a touch period; when the frame identification signal is a high level signal, the display device is in a flat panel display period. Within the touch period, the first electrodes 11 act as emitting electrodes Tx, the second electrodes 21 act as sensing electrodes Rx, and a drive signal is applied on the first electrodes 11 to generate a coupling electric field between the first electrodes 11 and the second electrodes 21. The drive signal may be a pulse signal. When a touch occurs, the coupling electric field is changed so as to change a sensing electrode signal on the second electrodes 21, so that the second electrodes 21 generate and output a touch signal. The touch signal may be used for determining a touch position. Within the touch period, the voltage applied on the third electrode 22 is 0V, no data signal is applied on the fourth electrode, and no gate signal is applied on a gate Gn. In practical applications, preferably, the third electrode 22 may be in a floating state, so that the third electrode 22 will not shield the touch signal. This case will not be specifically plotted in the Figs. It is to be noted that, 1, 2, 3, N−1 to N in the blocks of FIG. 5 refer to sequence numbers of gate signals applied on the gate.

Within the flat panel display period, the first electrodes 11 act as common electrodes, while the second electrodes 21 act as slit electrodes. A common electrode voltage Vcom is applied on the first electrodes 11, gate signals are successively applied on gates G1, G2 ... Gn to successively enable the gates G1, G2 ... Gn, and a data signal is applied on the fourth electrode to allow the display module to display a display picture. The display picture is a flat panel picture. Within the flat panel display period, there is no voltage difference between the third electrode 22 and the second electrodes 21. In other words, the voltage signal applied on the third electrode 22 is the same as the voltage signal applied on the second electrodes 21. Preferably, both the voltage signal applied on the third electrode 22 and the voltage signal applied on the second electrodes 21 are 0V, and the third electrode 22 may act as a shielding layer. In this case, no grating electric field is formed between the third electrode 22 and the second electrodes 21, so the liquid crystals 25 will not be deflected, and the liquid crystal cell is in a long white mode and will not affect the display picture displayed by the display module. As such the display picture is a flat panel picture. Therefore, the display module of the display device in FIG. 5 is in a 2D display mode.

Figure 6:
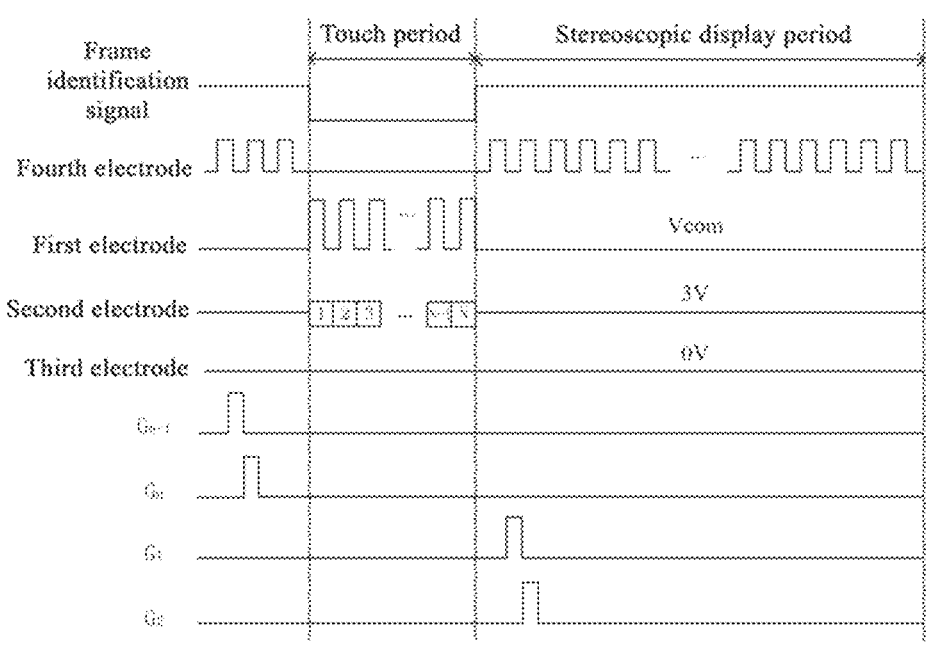
FIG. 6 is a timing diagram of a control signal when the display device performs stereoscopic display.

FIG. 6 is a timing diagram of a control signal when the display device performs stereoscopic display. As shown in FIG. 6, in order to reduce the mutual interference between the touch and the stereoscopic display, the display device may be driven in a time division driving manner, wherein a touch period may be 4 ms, and a stereoscopic display period may be 12.67 ms. The touch period and the stereoscopic display period are distinguished by a frame identification signal (Vsync). Specifically, as shown in FIG. 6, when the frame identification signal is a low level signal, the display device is in a touch period; when the frame identification signal is a high level signal, the display device is in a stereoscopic display period. Within the touch period, the first electrodes 11 act as emitting electrodes Tx, the second electrodes 21 act as sensing electrodes Rx, and a drive signal is applied on the first electrodes 11 to generate a coupling electric field between the first electrodes 11 and the second electrodes 21. The drive signal may be a pulse signal. When a touch occurs, the coupling electric field is changed so as to change a sensing electrode signal on the second electrodes 21, so that the second electrodes 21 generate and output a touch signal. The touch signal may be used for determining a touch position. Within the touch period, the voltage applied on the third electrode 22 is 0V, no data signal is applied on the fourth electrode, and no gate signal is applied on a gate Gn. In practical applications, preferably, the third electrode 22 may be in a floating state, so that the third electrode 22 will not shield the touch signal. This case will not be specifically plotted in the Figs. It is to be noted that, 1, 2, 3, N−1 to N in the blocks of FIG. 6 refer to sequence numbers of gate signals applied on the gate.

Within the stereoscopic display period, the first electrodes 11 act as common electrodes, while the second electrodes 21 act as slit electrodes. A common electrode voltage Vcom is applied on the first electrodes 11, gate signals are successively applied on gates G1, G2 ... Gn to successively enable the gates G1, G2 . . . Gn, and a data signal is applied on the fourth electrode to allow the display module to display a display picture. The display picture is a flat panel picture. Within the stereoscopic display period, there is a voltage difference between the third electrode 22 and the second electrodes 21. In other words, the voltage signal applied on the third electrode 22 is different from the voltage signal applied on the second electrodes 21. Preferably, the voltage signal applied on the third electrode 22 is 0V, and the voltage signal applied on the second electrodes 21 are 3V. In this case, a grating electric field is formed between the third electrode 22 and the second electrodes 21. As the liquid crystal cell is in a long white mode, and the deflected liquid crystals 25 form dark field regions, the liquid crystal cell forms a black and white alternating barrier effect, so that the display module 1 displays the display picture for stereoscopic display. Therefore, the display module of the display device in FIG. 6 is in a 3D display mode.

In the technical solutions of the display device provided by this embodiment, the display device includes a display module and a liquid crystal cell; the display module includes first electrodes, and the liquid crystal cell includes second electrodes and a third electrode arranged opposite to the second electrodes; a coupling electric field is formed between the first electrodes and the second electrodes within a touch period, and a grating electric field is formed between the second electrodes and the third electrode within a stereoscopic display period; the grating electric field allows the display module to form a display picture for stereoscopic display. In the display device provided by the present invention, the combination of a touch technology and a stereoscopic display technology is realized by the display module and the liquid crystal cell, thus the thickness of the display device is reduced, meanwhile the transmittance and display effect of the display device are improved, and moreover the display module and the liquid crystal cell are simple in manufacturing process and low in manufacturing cost. This embodiment may realize a multi-point full in cell touch and thus improves touch sensitivity and signal-to-noise ratio. This embodiment may realize a switchover between stereoscopic display and flat panel display, i.e., a switchover between 3D display and 2D display.

Embodiment 2 of the present invention provides a driving method of a display device. The driving method is used for driving the display device. The display device includes a display module and a liquid crystal cell which are arranged opposite to each other. The display module includes first electrodes, and the liquid crystal cell includes second electrodes and a third electrode arranged opposite to the second electrodes. The first electrodes and the second electrodes extend in different directions.

The driving method includes:

during stereoscopic display, forming a coupling electric field between the first electrodes and the second electrodes within a touch period, the coupling electric field being used for generating a touch signal when a touch occurs; and forming a grating electric field between the second electrodes and the third electrode within a stereoscopic display period, the grating electric field allowing the display module to form a display picture for stereoscopic display.

Optionally, the display module further includes a fourth electrode, and the driving method further includes:

during flat panel display, forming a coupling electric field between the first electrodes and the second electrodes within a touch period; and forming a flat panel display electric field between the fourth electrode and the first electrodes within a flat panel display period, the flat panel display electric field allowing the display module to form a display picture for flat panel display.

The driving method of a display device provided by this embodiment may be used for driving the display device provided by embodiment 1. For the specific description of the display device, reference may be made to embodiment 1 and it will not be repeated here.

In the technical solutions of the driving method of a display device provided by this embodiment, the display device includes a display module and a liquid crystal cell; the display module includes first electrodes, and the liquid crystal cell includes second electrodes and a third electrode arranged opposite to the second electrodes; a coupling electric field is formed between the first electrodes and the second electrodes within a touch period, and a grating electric field is formed between the second electrodes and the third electrode within a stereoscopic display period; the grating electric field allows the display module to form a display picture for stereoscopic display. In the display device provided by the this embodiment, the combination of a touch technology and a stereoscopic display technology is realized by the display module and the liquid crystal cell, thus the thickness of the display device is reduced, meanwhile the transmittance and display effect of the display device are improved, moreover the display module and the liquid crystal cell are simple in manufacturing process and low in manufacturing cost. This embodiment may realize a multi-point full in cell touch and thus improves touch sensitivity and signal-to-noise ratio. This embodiment may further realize a switchover between stereoscopic display and flat panel display, i.e., a switchover between 3D display and 2D display.

Embodiment 3 of the present invention provides a manufacturing method of a display device. The method may include:

Step 101: preparing a display module, the display module including first electrodes.

Step 102: preparing a liquid crystal cell, the liquid crystal cell including second electrodes and a third electrode arranged opposite to the second electrodes, the first electrodes and the second electrodes extending in different directions. During stereoscopic display, a coupling electric field is formed between the first electrodes and the second electrodes within a touch period, and a grating electric field is formed between the second electrodes and the third electrode within a stereoscopic display period. The coupling electric field is used for generating a touch signal when a touch occurs, and the grating electric field is used for allowing the display module to display a display picture for stereoscopic display.

Step 103: arranging the display module and the liquid crystal cell opposite to each other.

In practical applications, the execution order of step 101 and step 102 may be altered as required.

The manufacturing method of a display device provided by this embodiment may be used for manufacturing the display device provided by embodiment 1. For the specific description of the display device, reference may be made to embodiment 1, and it will not be repeated here.

In the technical solutions of the manufacturing method of a display device provided by this embodiment, the display device includes a display module and a liquid crystal cell; the display module includes first electrodes, and the liquid crystal cell includes second electrodes and a third electrode arranged opposite to the second electrodes; a coupling electric field is formed between the first electrodes and the second electrodes within a touch period, and a grating electric field is formed between the second electrodes and the third electrode within a stereoscopic display period; the grating electric field allows the display module to form a display picture for stereoscopic display. In the display device provided by the this embodiment, the combination of a touch technology and a stereoscopic display technology is realized by the display module and the liquid crystal cell, thus the thickness of the display device is reduced, meanwhile the transmittance and display effect of the display device are improved, and moreover the display module and the liquid crystal cell are simple in manufacturing process and low in manufacturing cost. This embodiment may realize a multi-point full in cell touch and thus improves touch sensitivity and signal-to-noise ratio. This embodiment may further realize a switchover between stereoscopic display and flat panel display, i.e., a switchover between 3D display and 2D display.

It should be understood that the foregoing implementations are merely exemplary implementations used for describing the principle of the present invention, but the present invention is not limited thereto. A person of ordinary skill in the art may make various modifications and improvements without departing from the spirit and essence of the present invention, and these modifications and improvements shall fall into the protection scope of the present invention.

The invention claimed is:

1. A display device, comprising a display module and a liquid crystal cell which are arranged opposite to each other, wherein the display module comprises first electrodes, and the liquid crystal cell comprises a liquid crystal layer, second electrodes and a third electrode, with the first electrodes and the second electrodes extending in different directions, wherein the display module is located on one side of the liquid crystal cell away from a display surface of the display device, the second electrodes are located on a side of the liquid crystal layer proximal to the display module, and the third electrode is located on a side of the liquid crystal layer away from the display module; and during stereoscopic display, a coupling electric field is formed between each of the first electrodes and all of the second electrodes within a touch period, and the first electrodes act as common electrodes and a grating electric field is formed between the second electrodes and the third electrode within a stereoscopic display period; and the coupling electric field is used for generating a touch signal when a touch occurs, and the grating electric field allows the display module to form a display picture for stereoscopic display.

2. The display device according to claim 1, wherein the display module further comprises a fourth electrode; and during 2D display, a coupling electric field is formed between the first electrodes and the second electrodes within a touch period, a flat display electric field is formed between the fourth electrode and the first electrodes within a flat display period, and the flat display electric field allows the display module to form a display picture for 2D display.

3. The display device according to claim 1, wherein the first electrodes are of a strip structure, the second electrodes are of a strip structure, and the third electrode is of a planar structure.

4. The display device according to claim 2, wherein the liquid crystal cell comprises an upper substrate and a lower substrate which are arranged opposite to each other, with liquid crystals being filled there between, the second electrodes is disposed on the lower substrate, and the third electrode is disposed on the upper substrate.

5. The display device according to claim 4, Wherein the display module comprises a first substrate and a second substrate which are arranged opposite to each other, with liquid crystals being filled there between, the lower substrate is located on the second substrate, and the first substrate comprises the first electrodes.

6. The display device according to claim 1, wherein during stereoscopic display, a voltage signal applied on the third electrode is the same as a voltage signal applied on the second electrodes.

7. The display device according to claim 2, wherein during 2D display, a voltage signal applied on the third electrode is the same as a voltage signal applied on the second electrodes.

8. A driving method for driving a display device which comprises a display module and a liquid crystal cell arranged opposite to the display module, the display module comprising first electrodes, the liquid crystal cell comprising a liquid crystal layer, second electrodes and a third electrode, the first electrodes and the second electrodes extending in different directions, and the display module further comprising a fourth electrode, wherein the display module is located on one side of the liquid crystal cell away from a display surface of the display device, the second electrodes are located on a side of the liquid crystal layer proximal to the display module, and the third electrode is located on a side of the liquid crystal layer away from the display module;

the driving method comprises the following steps of:

during stereoscopic display, forming a coupling electric field between each of the first electrodes and all of the second electrodes within a touch period, the coupling electric field being used for generating a touch signal when a touch occurs; and applying the first electrodes with a common electrode voltage and forming a grating electric field between the second electrodes and the third electrode within a stereoscopic display period, the grating electric field allowing the display module to form a display picture for stereoscopic display.

9. The driving method according to claim 8, further comprising:

during 2D display, forming a coupling electric field between the first electrodes and the second electrodes within a touch period; and forming a flat panel display electric field between the fourth electrode and the first electrodes within a flat panel display period, the flat panel display electric field allowing the display module to form a display picture for 2D display.

10. A manufacturing method of a display device, comprising:

preparing a display module, the display module comprising first electrodes;

preparing a liquid crystal cell, the liquid crystal cell comprising a liquid crystal layer, second electrodes and a third electrode arranged opposite to the second electrodes, the first electrodes and the second electrodes extending in different directions, wherein the display module is located on one side of the liquid crystal cell away from a display surface of the display device, the second electrodes are located on a side of the liquid crystal layer proximal to the display module, and the third electrode is located on a side of the liquid crystal layer away from the display module;

during stereoscopic display, a coupling electric field being formed between each of the first electrodes and all of the second electrodes within a touch period, and the first electrodes act as common electrodes and a grating electric field being formed between the second electrodes and the third electrode within a stereoscopic display period, the coupling electric field being used for generating a touch signal when a touch occurs, and the grating electric field allowing the display module to form a display picture for stereoscopic display; and arranging the display module and the liquid crystal cell opposite to each other.

11. The display device according to claim 7, wherein during 2D display, the voltage signal applied on the third electrode and the second electrodes is a voltage signal of 0V.

12. The driving method according to claim 8, further comprising:

during 2D display, applying a same voltage signal to the third electrode and the second electrodes.

13. The driving method according to claim 12, further comprising:

during 2D display, applying a voltage signal of 0V to the third electrode and the second electrodes.

* * * * *